(12) United States Patent
Sato et al.

(10) Patent No.: US 7,197,378 B2
(45) Date of Patent: Mar. 27, 2007

(54) COORDINATING CONTROLLER FOR ELECTRIC POWER EQUIPMENT

(75) Inventors: Yasuo Sato, Hitachi (JP); Masahiro Watanabe, Hitachi (JP); Kenji Ogawa, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 308 days.

(21) Appl. No.: 10/645,483

(22) Filed: Aug. 22, 2003

(65) Prior Publication Data

US 2004/0207264 A1    Oct. 21, 2004

(30) Foreign Application Priority Data

Aug. 23, 2002    (JP)    ............... 2002-242815

(51) Int. Cl.
*G05D 17/00*    (2006.01)
*G01R 21/133*    (2006.01)

(52) U.S. Cl. ............... 700/286; 700/296; 700/297; 705/412

(58) Field of Classification Search ............... 700/286, 700/295–297; 705/412
See application file for complete search history.

(56) References Cited

U.S. PATENT DOCUMENTS

| | | | |
|---|---|---|---|
| 6,915,186 B2 * | 7/2005 | Patterson, Jr. ............... | 700/286 |
| 2002/0082748 A1 * | 6/2002 | Enga et al. ............... | 700/291 |
| 2002/0198629 A1 * | 12/2002 | Ellis ............... | 700/286 |
| 2003/0158632 A1 * | 8/2003 | Nierlich et al. ............... | 700/295 |
| 2004/0023634 A1 * | 2/2004 | Jeong et al. ............... | 455/403 |

FOREIGN PATENT DOCUMENTS

| | | |
|---|---|---|
| JP | 11-032449 | 2/1999 |
| JP | 11-215703 | 8/1999 |
| JP | 200032658 | 1/2000 |
| JP | 2000014011 | 1/2000 |
| JP | 2000078748 | 3/2000 |
| JP | 2001-086645 A | 3/2001 |
| JP | 2002-238168 A | 8/2002 |

OTHER PUBLICATIONS

The Institute of Applied Energy, Aug. 6, 2002, with English translation (pp. 18-25).

* cited by examiner

*Primary Examiner*—Leo Picard
*Assistant Examiner*—Sean Shechtman
(74) *Attorney, Agent, or Firm*—Mattingly, Stanger, Malur & Brundidge, P.C.

(57) ABSTRACT

A coordination controller prevents the deterioration of electric power quality in an electric power system, such as in terms of voltage values, that can be caused when distributed power resources connected in parallel to the electric power system are operated without restrictions. A distributed power resource 103 includes means 112 for communicating with the outside of an electric power facility, means 116 for monitoring the current time, means 115 for synchronizing with the outside time, means 112 for receiving a control schedule for an electric power-consuming apparatus or electric power generating apparatus, and a coordination controller 101 for implementing the control schedule according to the time obtained by the time monitoring means 116.

11 Claims, 14 Drawing Sheets

FIG.4

```
<Schedule>
  <Head>
    <ScheduleID>CS077</ScheduleID>
    <From>Center001</From>
    <To>CS</To>
    <PublishTimestamp>2001.01.01.00.00.00</PublishTimestamp>
    <Valid>2001.01.01.23.59.59</Valid>
  <Head>
  <CommandList>
    <Command>
       <ExecTimestamp>2001.01.01.08.01.00</ExecTimestamp>
       <Target>ShR01</Target>
       <Operation>Off</Operation>
    </Command>
    <Command>
       <ExecTimestamp>2001.01.01.20.01.00</ExecTimestamp>
       <Target>ShR01</Target>
       <Operation>On</Operation>
    </Command>
    <Command>
       <ExecTimestamp>2001.01.01.20.01.00</ExecTimestamp>
       <Target>DPR01</Target>
       <Operation arg=0.95>Factor</Operation>
    </Command>
  </CommandList>
</Schedule>
```

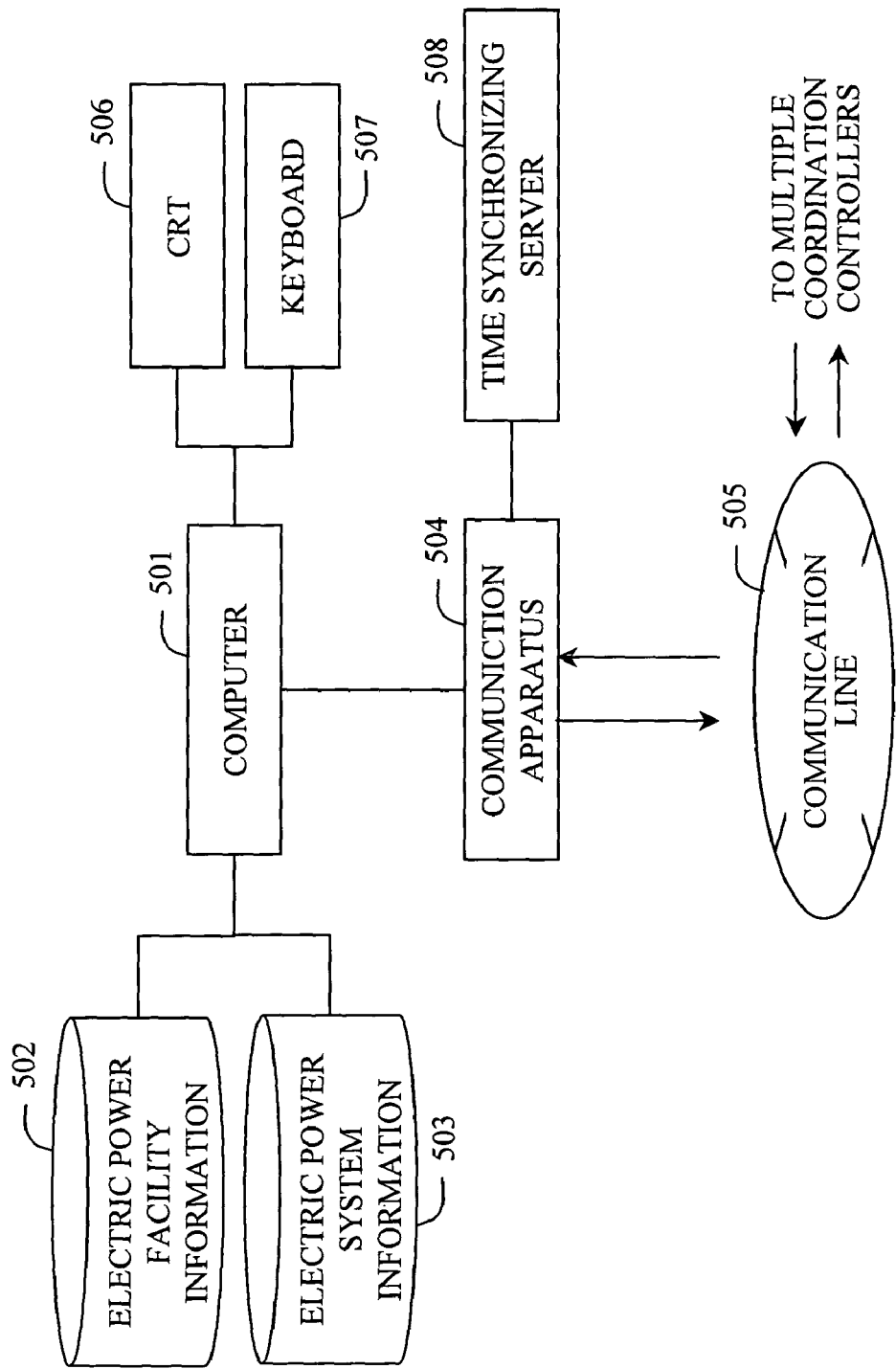

COORDINATING CONTROLLER FOR ELECTRIC POWER EQUIPMENT

BACKGROUND OF THE INVENTION

1. Field of the Invention

The present invention relates to a controller for adjusting the use of electric power at electric power facilities. In particular, it relates to means for coordinating an operation schedule with nearby customer equipment in order to maintain the quality of electric power in a power distribution network.

2. Background Art

Distributed power resources provided in customer equipment are normally operated in accordance with the demand from individual customers. In many cases, the method of operation, such as a base operation for high efficiency, a peak operation for lowering the contract demand, and a backup operation, is determined by the customer. When these distributed power resources are linked to an electric power system, a certain understanding is exchanged such that no adverse effect is experienced by the electric power system. The guidelines for such an understanding differ from country to country or depending on the operator of the electric power system. In any case, the individual customers with their individual electric power facilities are examined. As it is required that the quality of the electric power system not be disturbed in every possible state of operation of the distributed power resources, the customer might be demanded to furnish a phase modifying equipment or even the linkage itself might not be granted.

The operator of the electric power system must also equip the system with phase modifying equipment so that a predetermined power quality can be maintained no matter how the individual distributed power resources are operated. Under the premise that the distributed power resources are freely operated, the distributed power resources must be evaluated on the assumption that they are negative factors in terms of power quality, before their manner of installment is finalized.

On the other hand, from the viewpoint of power supply resources, there have been discussions about how effectively the effective power supplied by distributed power resources can be incorporated into the entire electric power system. For example, JP Patent Publication (Kokai) No. 2001-86645 discloses that by coordinating the methods of operating distributed power resources, an optimum power generating plan can be realized in a part of the power system or within a certain region. As the disclosed invention considers the problem in terms of effective power, the effect of such coordinated operation can be easily translated into monetary value.

SUMMARY OF THE INVENTION

On the assumption that all of the distributed power resources for which linkage has been granted are freely operated, the worsening of electric power quality must be evaluated by the electric power system under the most stringent conditions. For example, a distributed power resource equipped with an induction generator having much capacitance components, such as a wind power generator, could possibly cause a brief voltage drop when linked to the power system in parallel. When a plurality of such distributed power resources are closely linked to the power system, the operator of the power system must ensure that phase-modifying equipment is planned or a condition must be provided during the process of granting linkage application such that the voltage drop can be controlled within a certain level even when the multiple distributed power resources are linked in parallel.

However, it is rare that these distributed power resources are linked to the power system in parallel at very close timings. Thus, from the viewpoint of the entire power system, it would be making an excessive investment in equipment to manage the power quality on the assumption that all of the distributed power resources for which linkage has been granted are operated freely.

A controller for adjusting a coordinated operation of a plurality of electric power facilities is installed in each electric power facility. Each electric power facility includes an electric power generating apparatus, such as a distributed power resource, and an electric power-consuming apparatus. The coordination controller has the function of receiving an operation schedule from an operation instruction system for scheduling the entire coordination, the operation schedule relating to the electric power facility in which the coordination controller is installed. The coordination controller also includes a time synchronizing means and other means for determining the timing of connecting or disconnecting the electric power facility to a system, the adjustment of phase factors and output amounts, and the switching of modes of operation according to the distributed schedule.

An analysis calculation means and a plan creating means implemented inside the operation instruction system create a coordination schedule incorporating operation instructions for the individual electric power facilities, under the condition that the quality of the electric power system can be maintained at a certain level. The electric power system as a whole is evaluated in terms of the avoidance of brief voltage drop upon connection or disconnection to or from the system, the adjustment of voltage distribution due to the multiple phase factors of the electric power facilities, and the restriction of voltage imbalance. The coordination schedule describes combinations of instructions concerning the control contents and their times of implementation on a daily or weekly basis.

Because the operation of the individual electric power facilities is adjusted by the coordination controller according to the coordination schedule, the assumption that all of the distributed power resources to which linkage has been granted will be operated freely can be discarded. For example, when a plurality of distributed power resources equipped with inductive generators having much capacitive components are closely linked to the electric power system, the invention can ensure that the distributed power resources are connected in parallel at different timings on the order of seconds. Thus, the operator of the electric power system can expect to be able to reduce investment in equipment in planning phase-modifying equipment. The operators of the distributed power resources can gain economic advantage due to the relaxation of requirements during the examination of linkage applications.

By effectively utilizing both the positive and negative effects of the distributed power resources on the quality of the electric power system, the equipment cost for the maintenance of the electric power quality can be minimized from the viewpoint of the operator of the electric power system and those of the electric power facilities as a whole. Thus, the multiple operators can share the resulting economic advantage.

BRIEF DESCRIPTION OF THE DRAWINGS

FIG. 4 shows an example of the transmitted contents of a control schedule.

FIG. 5 shows a functional block diagram of an operation instruction system.

DESCRIPTION OF THE PREFERRED EMBODIMENTS

Figure 1:
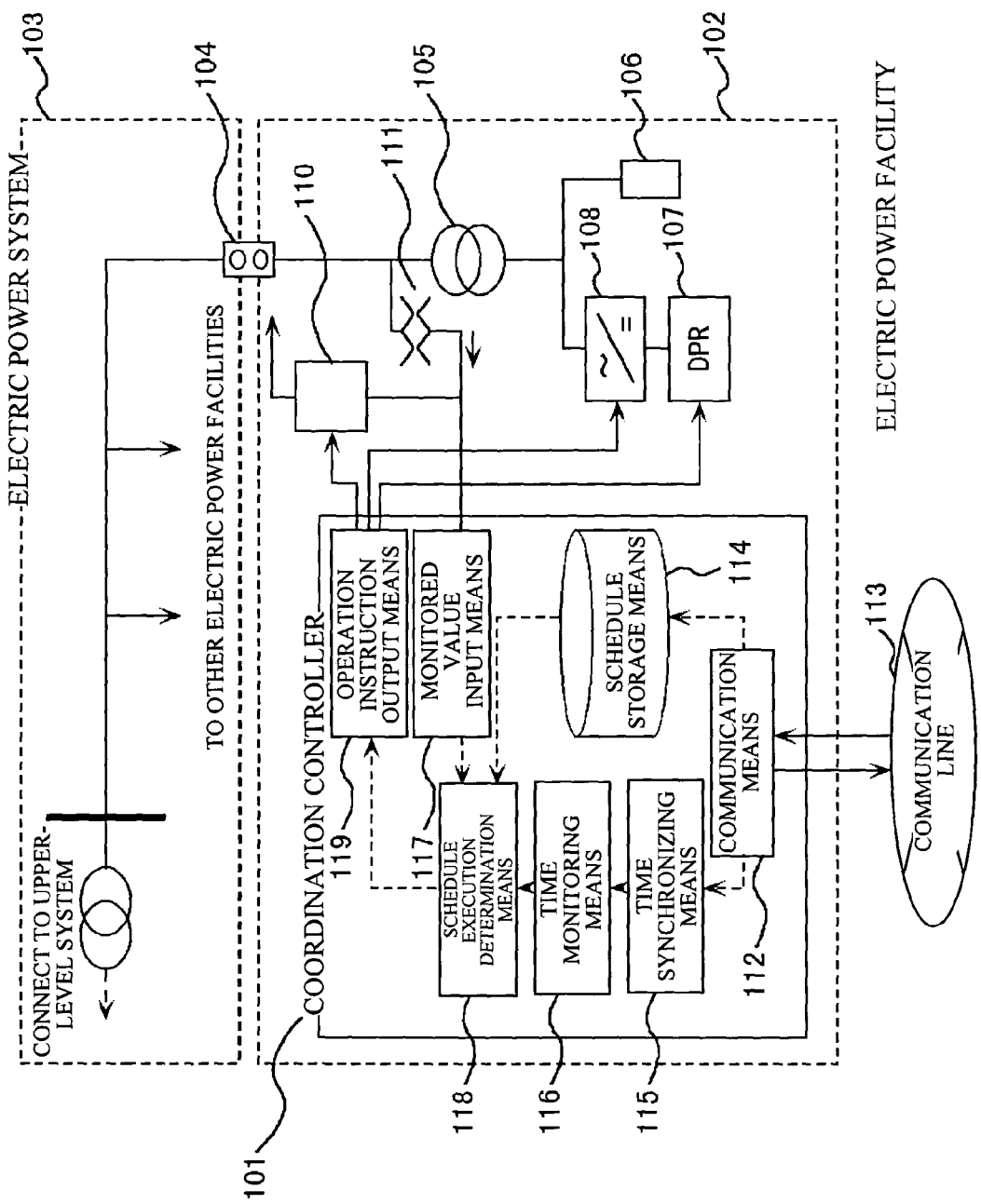
FIG. 1 shows an example of an electric power facility equipped with a coordination controller according to the invention.

FIG. 1 shows a functional block diagram of an electric power facility 102 equipped with a coordinating controller 101 according to the invention. The power facility 102 is linked to a power system 103, and the linkage can be made or broken by a linkage facility 104.

Hereafter, the electric power facility in which the coordinating controller is installed will be described. The electric power facility 102 includes electric power equipment. In the present embodiment, the electric power system 103 is connected to a plurality of power-consuming apparatuses 106 via a linkage facility 104 and a private transformer 105. As a power generator, a distributed power resource (DPR) 107 is installed, which is linked via a power converter 108 to private wiring and the power system 103. For linking the DPR 107 to the electric power system, a control panel 110 is installed in order to control the connection/disconnection operation by the linkage facility 104 and provide a protection function or an isolated operation detecting function necessary for system linkage. Thus, the control panel 110 is configured to receive an input from an apparatus 111 for monitoring the system voltage in the electric power facility.

Next, the internal structure of the coordinating controller and its external interface will be described. The coordinating controller includes a communication means 112, so that it can send or receive data via an external communication line 113. The communication line has two major roles.

One role is to receive a control schedule concerning the electric power facility. For this purpose, the communication means has the function of storing a schedule received from the outside in a schedule storage means 114.

The other role of the communication means is to provide chronological synchronization with the outside. For this purpose, the communication means includes a time synchronizing means 115 allowing for chronological synchronization with a distant time server by communication. By providing this chronological synchronization to a time monitoring means 116, an internal timer in the coordinating controller can be synchronized with the external time server.

Some of the other functions of the coordinating controller are not related to anything but communication with the outside. In order to determine whether or not the control schedule should be strictly implemented, the electrical conditions of the electric power facility must be considered. For this purpose, the coordinating controller includes a monitored value input means 117 for receiving values from the voltage monitoring apparatus 111, for example.

The schedule storage means, time monitoring means, and monitored value input means are thus configured. Based on the inputs from these means, a schedule implementation determination means 118 and an operation instruction output means 119 determine whether or not the schedule should be implemented. The schedule implementation determination means 118 determines the necessity of implementing each schedule (the processing flow will be described later). When the instruction implementing conditions described in the schedule are all met, the operation instruction output means 119 outputs instructions for operating the electric power facility. In the case of FIG. 1, there are three output lines. One is the control panel 110 for managing the linkage facility 104, to which the operation instruction output means 119 outputs instructions concerning the making or breaking of parallel linkage. Another is the power converter 108 to which the operation instruction output means 119 outputs an instruction concerning the adjustment of phase factor. The third is the DPR 107, to which the means 119 outputs instructions concerning the switching of operation modes or the adjustment of output.

These control instructions are intended to coordinate the overall schedule with the external electric power facility. Thus, the electric power facility can be operated in such a manner as to contribute to the maintenance of quality of the electric power system. Preparation of the schedule will be described later.

Figure 2:
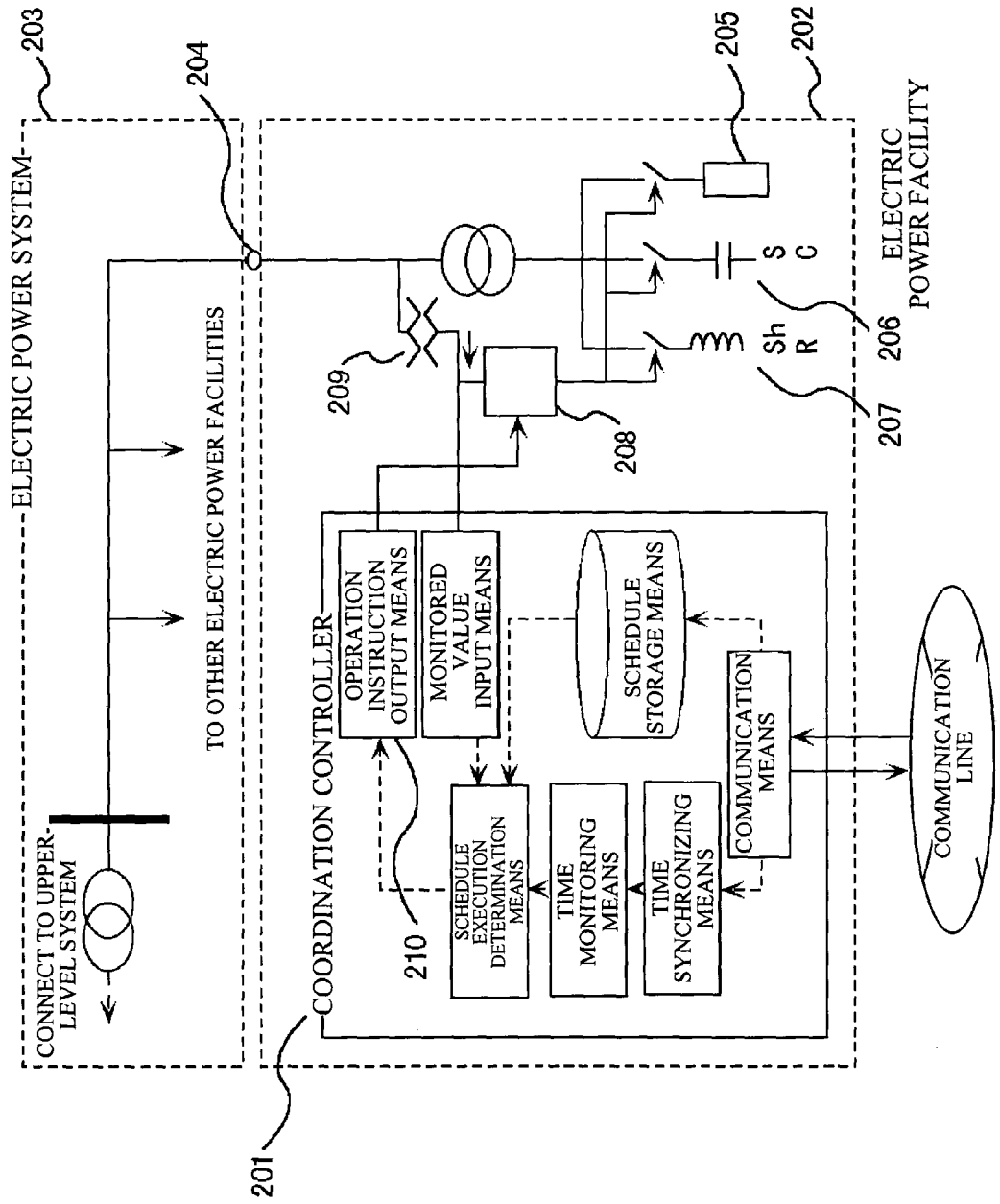
FIG. 2 shows another example of the electric power facility equipped with a coordination controller according to the invention.

FIG. 2 shows a functional block diagram of another embodiment of the electric power facility equipped with the coordinating controller. The electric power facility in which the coordinating controller is installed will be described first. The relationships among a coordinating controller 201, an electric power facility 202, and an electric power system 203 are roughly similar to those in FIG. 1. In the present embodiment, however, a linkage point 204 between the electric power facility 202 and the electric power system 203 is not provided with a linkage facility, so that the making or breaking of parallel linkage to the system cannot be controlled.

As in the case of FIG. 1, a plurality of electric power-consuming apparatuses 205 are connected via a private transformer in the electric power facility 202. In contrast to FIG. 1, however, a capacitor 206 and a reactor 207 are linked to private wiring and the electric power system 203 as devices for compensating the phase factor. The making or breaking of connection of these devices is controlled by a control panel 208. The control panel 208 is configured to receive inputs from an apparatus 209 for monitoring the system voltage within the electric power facility.

Next, the internal structure of the coordinating controller and its external interface will be described. The coordinating controller includes a schedule storage means, a time monitoring means, a monitored value input means, and a schedule implementation determination means that are similar in function and configuration to those of FIG. 1. The present embodiment differs from the first embodiment in the external interface of an operation instruction output means 210. Specifically, in the case of FIG. 2, the operation instruction output means 210 outputs instructions to the control panel 208 concerning the turning on or off of the devices 205 to 207.

As in the case of FIG. 1, these control instructions are intended to coordinate the overall schedule with the external electric power facility. Thus, the electric power facility shown in FIG. 2 can be operated with modified phase so that it can contribute to the maintenance of quality of the electric power system. Preparation of schedules will be described later.

Figure 3:
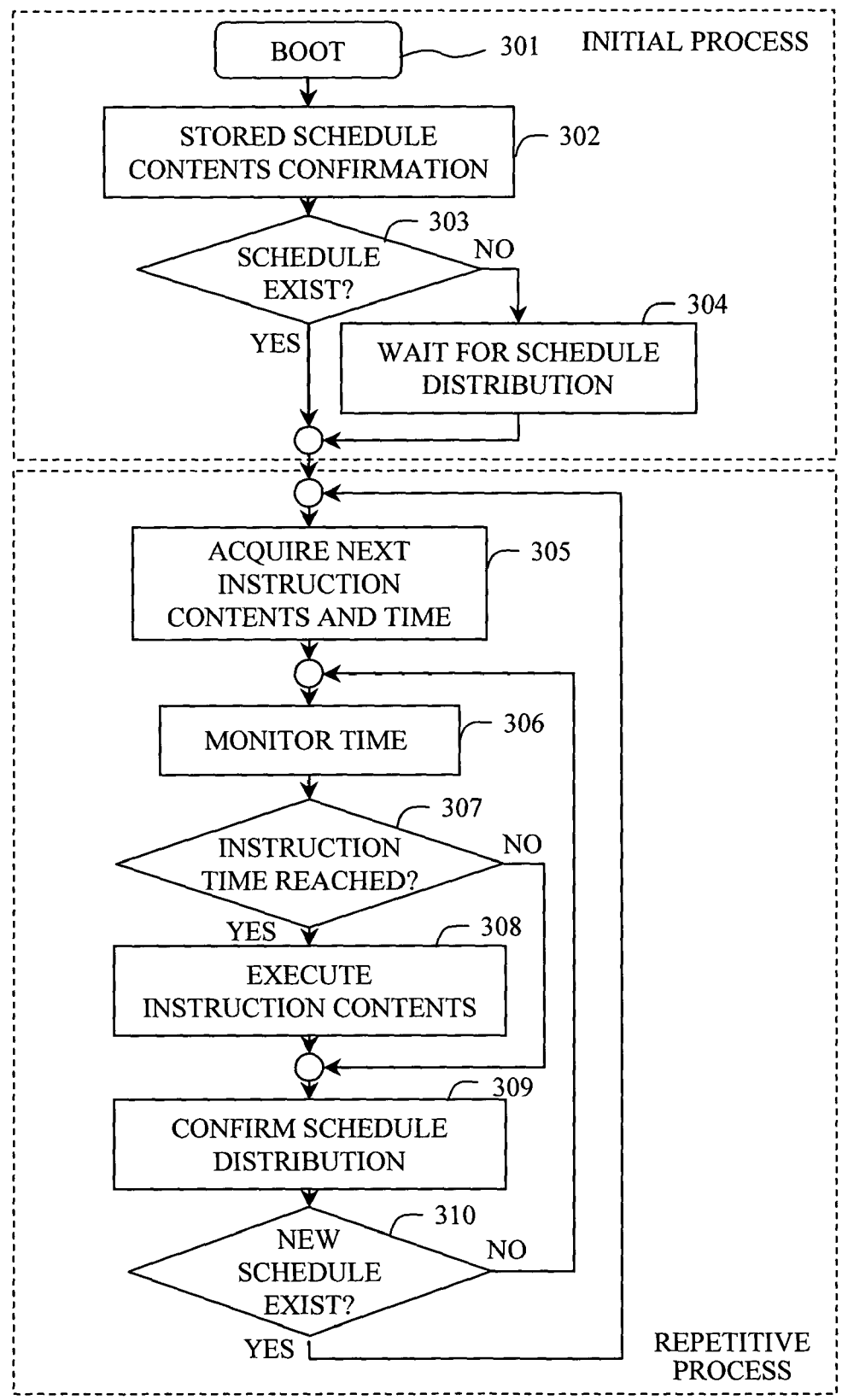
FIG. 3 shows a processing flow of the coordination controller.

Now referring to FIG. 3, the processing flow in the schedule implementation determination means will be described. As the coordinating controller is basically operated continuously, a repetitive process is carried out once an initial process is carried out upon activation of the processing flow.

In the initial process, following the start in step 301, the contents of the stored schedule are confirmed in step 302. Schedule data is drawn out of the schedule storage means 114 of FIG. 114. In step 303, the presence or absence of schedule and whether it is valid or not are determined. If no valid schedule data has been confirmed, the routine waits in step 304 until a schedule is newly delivered, and no schedule-based control is effected. If a valid schedule is identified, the process goes to the repetitive process.

As a first step of the repetitive process, a subsequent instruction contents/time acquiring process 305 acquires the contents of a next planned instruction and its time from the schedule data (the method of displaying schedule data will be described later). The next instruction time is compared with the time acquired in the time acquisition process 306 in an instruction time comparison process 307. The synchronization of the time information obtained by the time monitoring means 116 in the time monitoring process with the time server is ensured by the time synchronizing means 115 that is separately operated from the present processing flow.

If the instruction time comparison process 307 determines that the instruction time has been reached, the instruction contents acquired in the process 305 are handed over to the operation instruction output means 119 in an instruction contents executing process 308. If the instruction time has not yet been reached, no control instruction is produced and the process waits until an instruction time, while confirming if there has been a delivery of a new schedule. In a schedule delivery confirmation process 309, flag information is acquired that indicates if there has been a valid update in the schedule storage means 114, and a decision is made in a decision process 310. If there has been a schedule update, the process continues at the subsequent instruction contents/time acquisition process 305.

Referring to FIG. 4, an example of the method of describing the schedule data will be described. The illustrated schedule is equivalent to the transmitted contents of the control schedule received from the outside. In the present embodiment, the schedule data is described by an XML description, as shown by the list in FIG. 4. A series of data is described, with a Schedule tag 401 as the root.

A header portion 402 shows header information indicating the attributes of the schedule data itself. As shown in FIG. 4, the header information describes the recognition ID of the schedule data, a distributor that created the schedule, a destination that executes the schedule, and the date of creation or validity limit of the schedule. In the schedule implementation determination means shown in FIG. 3, the contents of the header portion 402 are confirmed by the schedule storage content confirmation process 302 or the next instruction contents/time acquisition process 305, thus confirming the validity of the schedule.

In a latter-half portion 403 of the list of FIG. 4, a plurality of Command tags describing the contents of instructions for the apparatus inside the electric power facility are listed up. In the present example, tags 404 to 406 are described. The tag 404 describes that a controlled object "ShR001" is connected in parallel at 8:01 a.m. Similarly, the tag 405 describes that the controlled object "ShR01" is disconnected at 8:01 p.m. Thus, the operation for connecting or disconnecting the distributed power resources or compensator, for example, to the system are described as a schedule. According to the same grammar, the tag 406 describes that the operation phase factor is changed concerning a controlled object "DPR01." By storing such tags in a list structure, the pattern operation of the phase factor can be described in a schedule.

As described above, the control instruction transmitted to the coordinating controller is intended to make it possible to coordinate a plurality of electric power facilities from the viewpoint of the overall schedule. Such a schedule for providing instructions to the coordinated operation device of the electric power facility is prepared by an operation instruction system in the present embodiment. The list of FIG. 4 has thus been prepared by that system. The operation instruction system manages data concerning the electric power system and the electric power facilities as the objects of the coordinating schedule. The designation of the control object (such as "ShR01") refers to the contents registered in the operation instruction system in advance.

FIG. 5 shows a functional block diagram of the operation instruction system. Basically, the operation instruction system is a computer system built around a computer 501 as a server. A database 502 relating to the multiple electric power facilities under the jurisdiction of the operation instruction system, and a database 503 in which information about the electric power system to which the electric power facilities are linked is stored, are connected to the computer 501. A communication apparatus 504 makes it possible to transmit or receive data to and from coordinating controllers provided in electric power facilities via a communication line 505. As described above, by the distribution of the schedule using this data transmitting/receiving function, the coordinating controller outputs control instructions to the power-consuming apparatus and/or electric power generating apparatus in the electric power facility.

As the operation of the operation instruction system may involve human monitoring or managing processes, the system is also equipped with an input/output GUI such as a CRT 506 and a keyboard 507. Further, in order to allow the individual coordinating controllers to be correctly synchronized with the reference time, a time synchronizing server is installed inside the operation instruction system.

Figure 6:
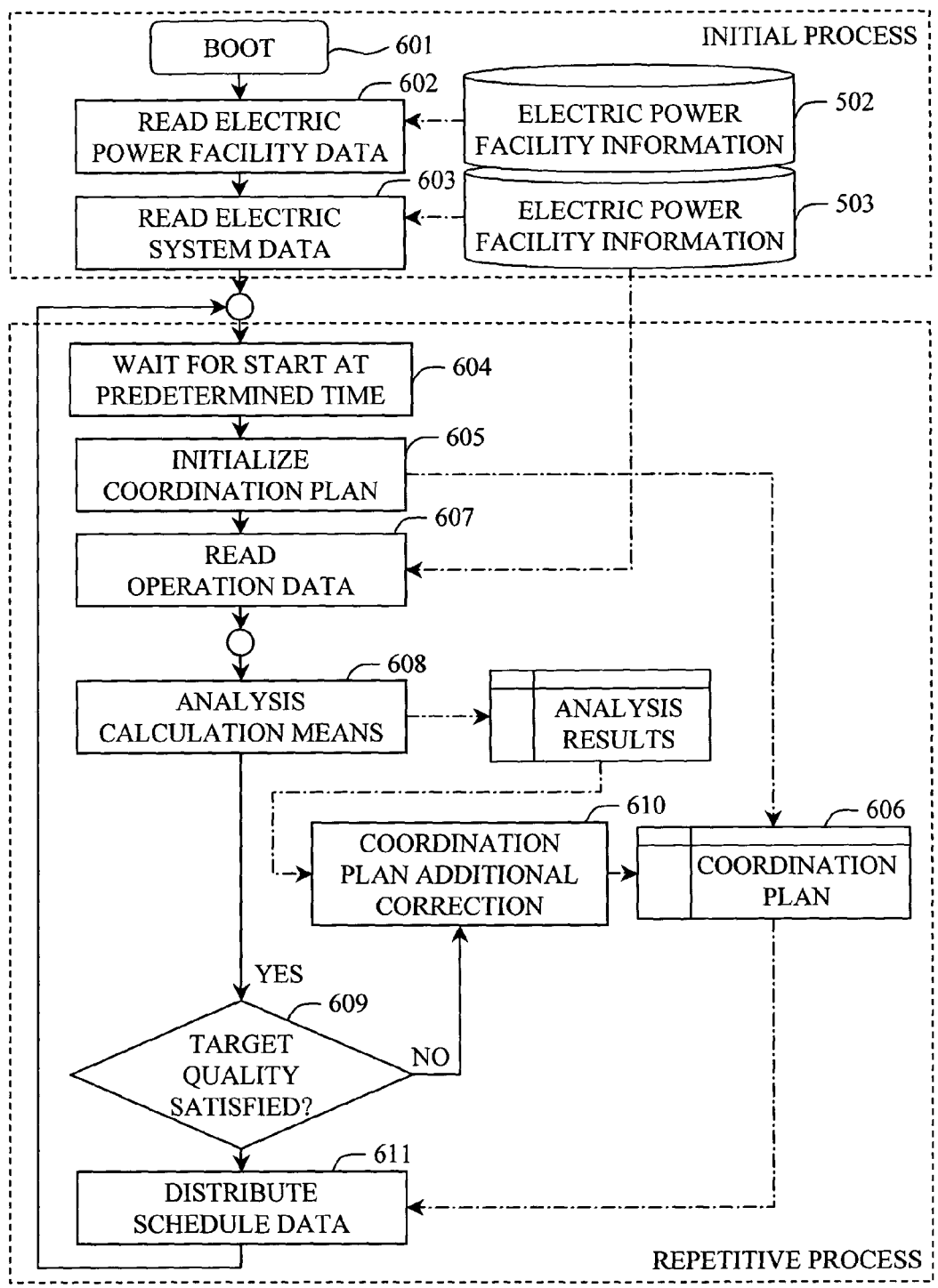
FIG. 6 shows a processing flow of the operation instruction system.

The schedule transmitted to the coordinating controller is prepared by the computer 501 shown in FIG. 5. The purpose of creating a coordinated schedule for all of the electric power facilities is so that the quality of electric power can be maintained for a predetermined period of time in the electric power system network to which the electric power facilities are linked. Under the condition that the quality of electric power can be maintained at a certain level, a coordinated schedule is created in which operation instructions for the individual electric power facilities are incorporated. As in the above example, the coordination schedule describes combinations of instructions concerning the contents and times of control on a daily or weekly basis. An example of the processing flow in the computer 501 in FIG. 5 is shown in FIG. 6. Because the operation instruction system is also operated continuously, the processing flow carries out a repetitive process once an initial process is completed at the start of the flow.

After the system is started in 601, the initial process is performed. In this process, an electric power-facility data reading process 602 refers to the database 502 for the stored configuration and electric characteristics of the electric power-consuming apparatus and electric power generating apparatus in each electric power facility. For example, the process 602 reads the amount (registered value) of electric power consumption in the electric power-consuming apparatus, or data concerning controllable means (the load shut-down function and its capacity, and the phase-factor adjusting function and its margin of adjustment). The registered information in the database 502 is provided by the owners of the electric power facilities that participate in the operation instruction system and updated as required.

Also in the initial process, an electric power system data reading process 603 refers to the database 503 for the stored information about the configuration, electric characteristics, and operation plan of the electric power system whose electric power quality must be controlled. For example, the process 603 reads information about the manner of connections of equipment such as lines and transformers, and their impedance data. The data in the database 503 is provided by the owner/operator of the electric power system network.

After gathering the minimum required data in the initial process, the operation instruction system proceeds to the repetitive process. The schedule is created at daily or weekly intervals. In a fixed-time bootwait process 604, an appropriate boot timing is determined. For example, if the schedule is created on a daily basis, the boot timing is set to initiate the schedule creating process toward the evening of the day before the target day, so that the schedule can be distributed during the night.

If the boot timing has been met, a coordination plan initializing process 605 clears coordination plan data 606 to zero. After that, processes are continued to add necessary control to the electric power facilities.

An operation data reading process 607 monitors the state of operation of the electric power system. The operation state includes demand predictions for a specific region depending on the seasons or time, and data concerning the turning on or off of the phase modifying equipment in the electric power system, for example. After obtaining these items of data, an analysis calculation means 608 evaluates the quality of the electric power in the electric power system. The calculation method, which depends on the target electric power quality, involves the evaluation of voltage in each phase by power flow calculation.

The results of evaluation are judged by a decision 609 to determine whether the target quality has been met. If not, a coordination-plan additional-correction process 610 additionally corrects the control of the electric power facilities. Regarding the contents of the coordination-plan additional-correction, the calculation method also depends on the target electric power quality. For example, the turning on or off of the phase modifying equipment with a shut-down function in an electric power facility can be assigned by dynamic programming. In the coordination-plan additional-correction process, basically a control schedule is sequentially added to find a satisfying solution. If the constraints are strict, a method is employed to find a noninferior solution.

If the decision 609 has been satisfied by the coordination plan (including an empty plan) obtained by repeating the coordination-plan additional-correction process 610 zero times or more, a schedule data distribution process 611 is implemented. Specifically, the resultant coordination plan is distributed to each coordinating controller by the communication function 504 shown in FIG. 5. The distribution is conducted with time allowance. For example, the distribution of a plan for the next day can be initiated one hour prior to its execution. The process 611 includes a distribution path switching function and a re-transmission function, so that transmission error due to temporary problems on a communication network can be avoided.

As described above, the target electric power quality can be considered in many ways. For example, it can be defined in terms of the avoidance of brief voltage drop when connecting to or disconnected from the system, the adjustment of voltage distribution due to the multiple phase factors of the electric power facilities, or the restriction of voltage imbalances. Depending on particular purposes, the details of the analysis calculation means 608 or the coordination-plan additional-correction means 610 vary. In an actual system, the target quality is defined by the operator. Thus, the algorithm for the system should preferably be modified depending on particular purposes in a flexible manner. In the following, the contents of the coordination-plan additional-correction process and those of the data referred to in the process will be described by way of examples and with reference made to the drawings.

Figure 7:
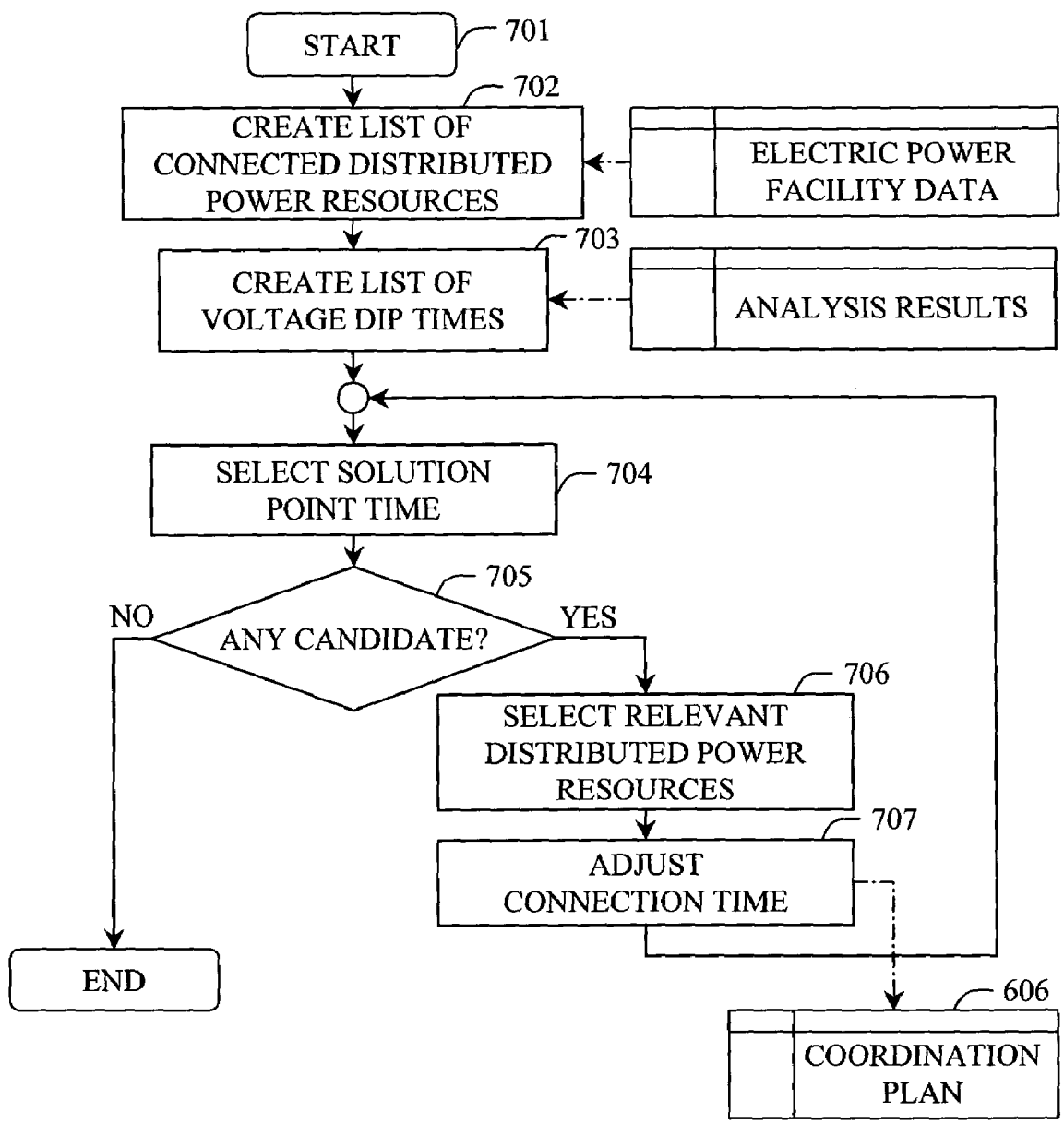
FIG. 7 shows an example (No. 1) of a coordination plan creating procedure.

FIG. 7 shows an example of the coordination-plan additional-correction means for suppressing a temporary voltage drop (to be referred to as a voltage dip) upon turning on a distributed power resource within a certain level. At a start 701, the various items of data had been read and the analysis calculation in an assumed situation prior to the coordination plan had been conducted. The coordination schedule in this example concerns the entire day next day. Therefore, in the analysis calculation, a power flow calculation is conducted for each time cross-section of the entire next day, taking into consideration the behavior of each device.

First, a process 702 creates a list of distributed power resources as the operation objects. Based on the electric power facility data that has been read, those distributed power resources are selected that are connected to the electric power system in time bands for which the plan is to be created and that have inductive capacity of at least a certain level. A certain time width since the turning on of a distributed power resource is defined as the range of influence of that power resource.

Then, a process 703 for creating a list of voltage-dip times extracts voltage dips of the objects of analysis. Based on the analysis results, the time that is close to the time of turning on of the distributed power resource and at which a voltage dip exceeding a certain permissible level is occurring is searched, and a list is created based on such times and locations of voltage dips. A series of dips that are occurring continuously are considered to be a single dip whose lowest voltage point is determined to be the location of occurrence. In the subsequent processes, the times of turning on of the distributed power resources are coordinated so that each one of the voltage dip times in the list can be resolved.

A process 704 for selecting a solution point time focuses on a single time in the voltage dip time list. If a decision 705 shows that there is no time to be selected, all of the problems will have been solved. If there is a selection object, the routine continues at processes for creating a schedule for dissolving the relevant dip.

A process 706 for selecting a distributed power resource selects one or more distributed power resources from the list of connected distributed power resources that include a time band of concern in its influence range, that are connected to the same power distribution line, and that are linked at a predetermined linkage distance from the location where the voltage dip has occurred. When more than one distributed power resource is selected, the voltage dip of concern might be dissolved by adjusting the connection timings.

A connection time adjusting process 707 creates a schedule for shifting the connection timing of all of the distributed power resources selected by the process 706 forward or backward, so that the regions of influence of the individual distributed power resources are not superposed upon one another. The results are added to the coordination plan and the routine continues at the next process 704 for selecting the solution time.

Figure 8:
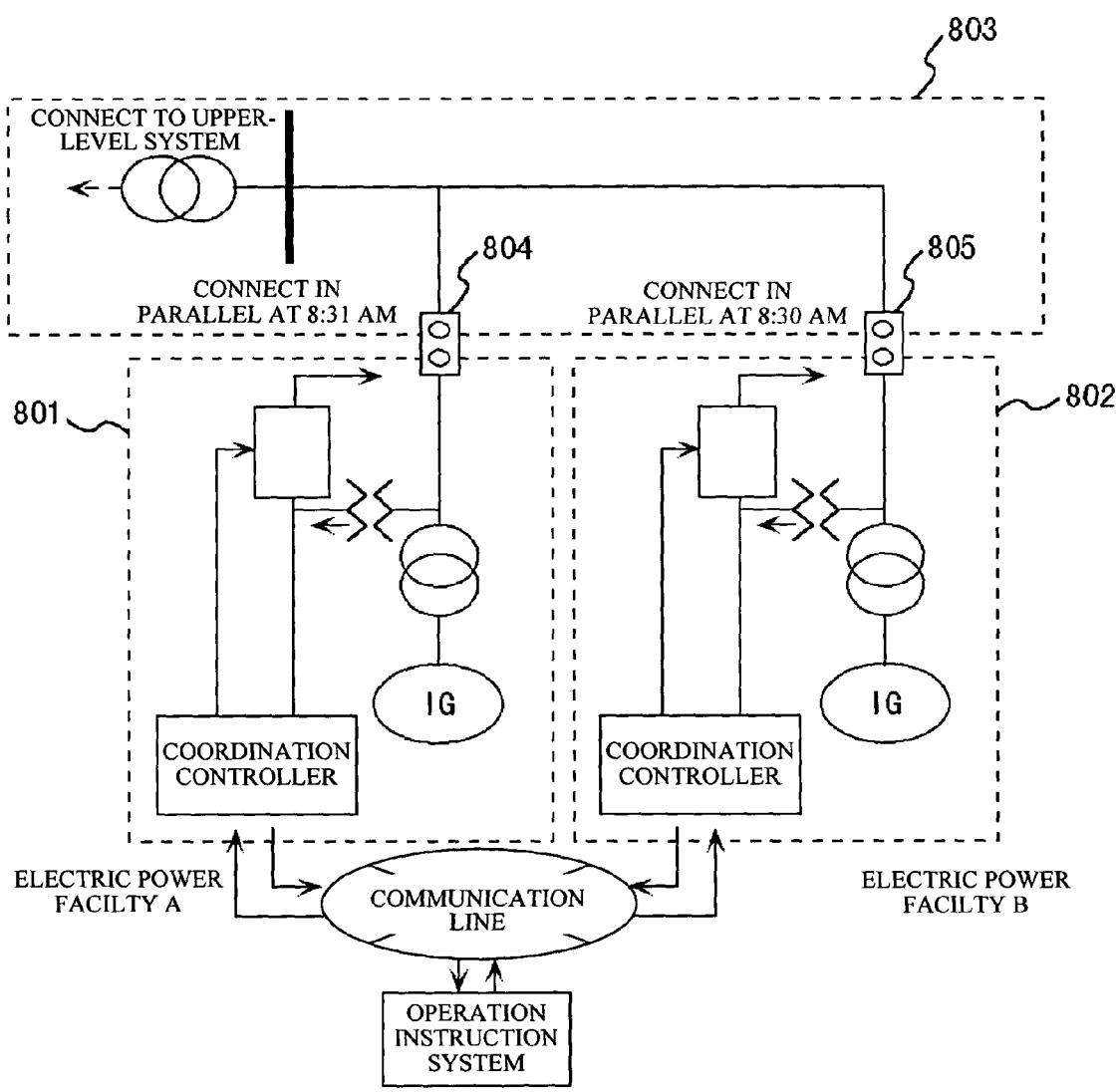
FIG. 8 shows an example (No. 1) of a coordinated operation in an electric power system.
Figure 9:
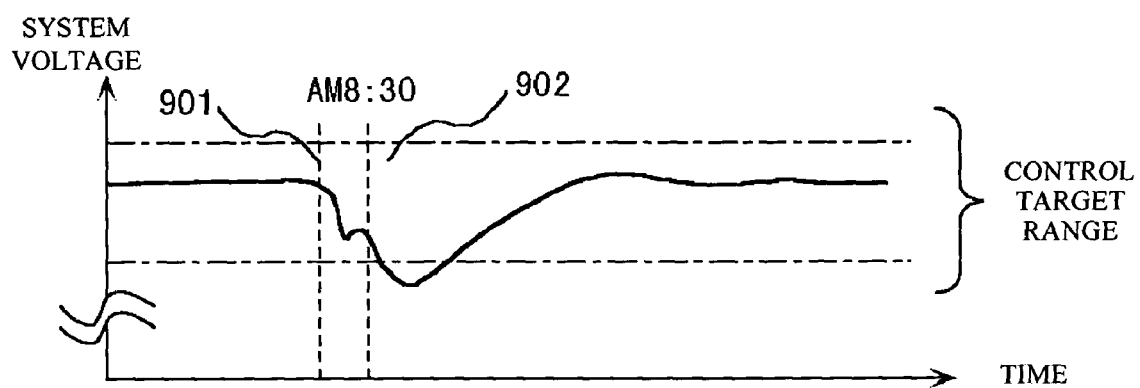
FIG. 9 shows an example (No. 1) of the coordinated operation in the electric power system (prior to coordination).
Figure 10:
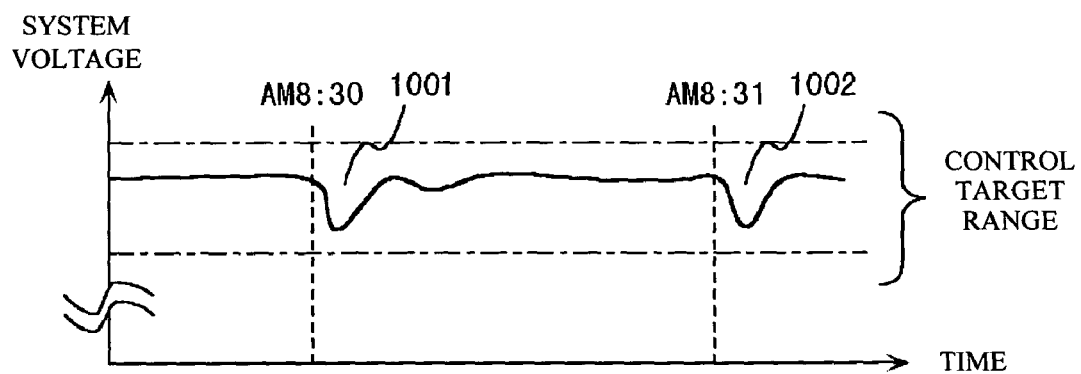
FIG. 10 shows an example (No. 1) of coordinated operation in the electric power system (after coordination).

By repeating the coordination-plan additional-correction means 610 as shown in FIG. 7, a scheduling is implemented that avoid the voltage dips as a whole. For example, it is now assumed that electric power facilities A (801) and B (802) each having an inductive generator (IG) are closely linked to an electric power system 803, as shown in FIG. 8. The electric power facilities are typically linked in the morning for various reasons. If the electric power facilities A and B were to be connected at very close time (8:30 a.m. in FIG. 9), without making any coordination efforts, voltage dips 901 and 902 would appear and pose problems. To address such a situation, a schedule is created in the example of FIG. 8 whereby the demand from each electric power facility is somewhat modified by the above-described means so that a facility 804 linked to the electric power facility A is connected at 8:31, while a facility 805 linked to the electric power facility B is connected at 8:30. As a result, as shown in FIG. 10, voltage dips 1001 and 1002 are kept within a permissible voltage range.

Thus, the operation instruction system according to the invention can make sure that voltage dips are avoided. This makes it possible to link a wind power generator of such a small capacity that it would not be granted for system linkage without equipping it with a compensating device according to the prior art, with minimum facility investment.

Figure 11:
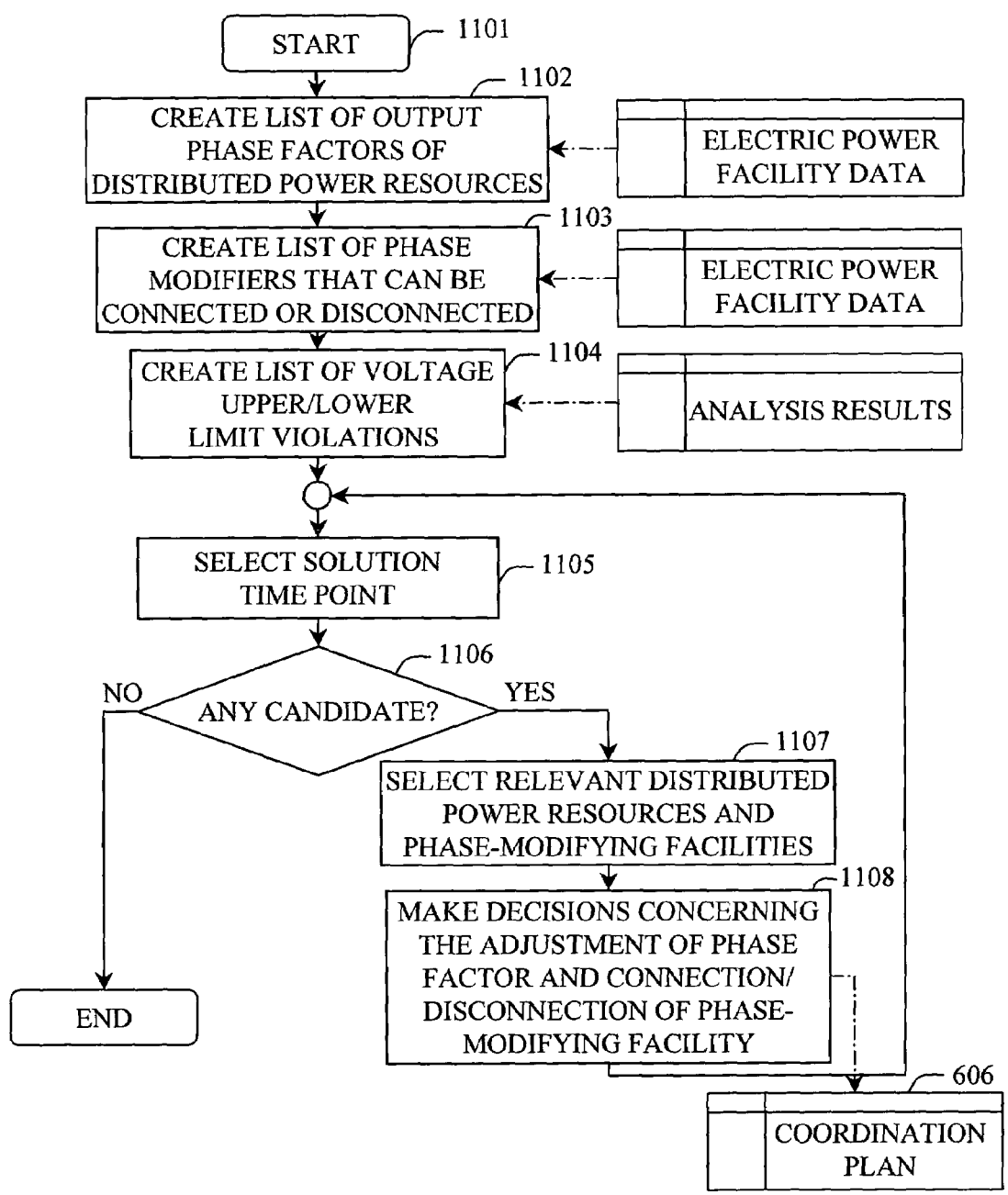
FIG. 11 shows an example (No. 2) of the coordination plan creating procedure.

Hereafter, another example of the coordination-plan additional-correction process will be described. FIG. 11 shows an example of the coordination-plan additional-correction means for the purpose of satisfying the upper and lower limits of a constant voltage value in an electric power distribution network. There is a greater likelihood of violation of the upper and lower limit if a linkage mainly includes many distributed power resources. At start 1101, the various types of data had been read and the analysis calculation had been conducted, as in the example of FIG. 7. In the analysis calculation, a power flow calculation is conducted with regard to all of the time cross-sections of the entire next day, taking into consideration the behavior of each device.

First, a process 1102 for creating a list of output phase factors of distributed power resources creates a list of the distributed power resources as the object of operation. From the electric power facility data that has been read, distributed power resources are selected that are linked to the electric power system in the time band for which the plan is formulated, and that have output plans of at least a certain level. A process 1103 for creating a list of phase modifiers creates a list of phase modifying facilities that can be connected or disconnected from the electric power system in the time band of concern.

Then, a process 1104 for creating a list of voltage upper/lower limit violations searches for voltage upper/lower limit violations as the object of analysis. Based on the result of analysis, a list of location and time of voltage changes that exceed a permissible range for more than such a duration of time that the changes can be considered a steady state. The locations where voltage dips occur are managed on the basis of distribution feeders downstream of transformer stations. Namely, voltage violations that occur in the same feeder are considered as a single problem. The time of occurrence of a voltage drop is when the degree of violation of the limits is greatest (in terms of the square error, for example) in the feeder under consideration.

In a process 1105 for selecting the solution point and time, one of the problems in the list of the voltage upper/lower limit violations is selected. If a decision 1106 determines that there is a problem that is selected, the routine continues at processes for creating a schedule for dissolving the problem.

With regard to the distribution feeder under consideration, a process 1107 for selecting distributed power resources and load extracts all of the distributed power resources and the phase modifying facilities that are linked. Using these items of data as control variables, a combinational problem concerning the control for optimizing the voltage distribution at the times of the problems is determined. In a process 1108 for the adjustment of phase factors and the disconnection of the phase modifiers, optimized calculations are conducted to find a near-optimal solution of an integer-mixed problem, using the phase factor as a continuous variable in an adjustable range in the case of phase factor-variable distributed power resource, or using a change associated with the turning on or off of a phase modifying equipment as a discrete variable. The results are incorporated into the coordination plan, and the routine continues at the next process 1105 for selecting the solution time.

Figure 12:
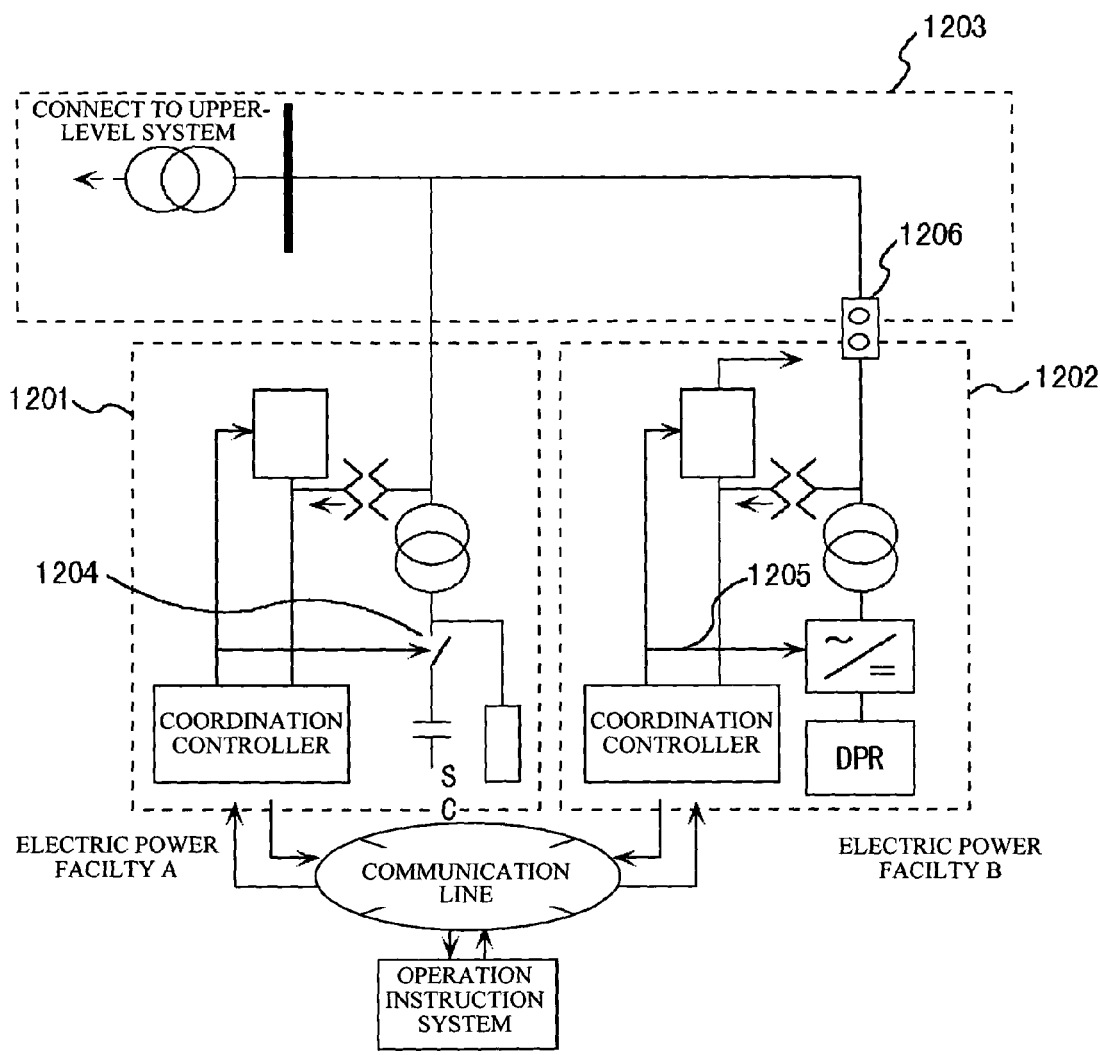
FIG. 12 shows an example (No. 2) of coordinated operation in the electric power system.
Figure 13:
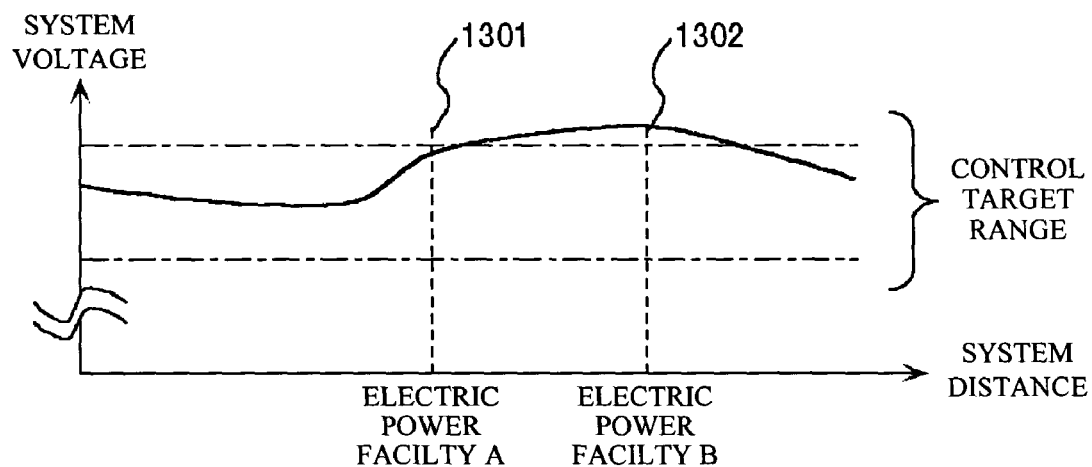
FIG. 13 shows an example (No. 2) of coordinated operation in the electric power system (prior to coordination).
Figure 14:
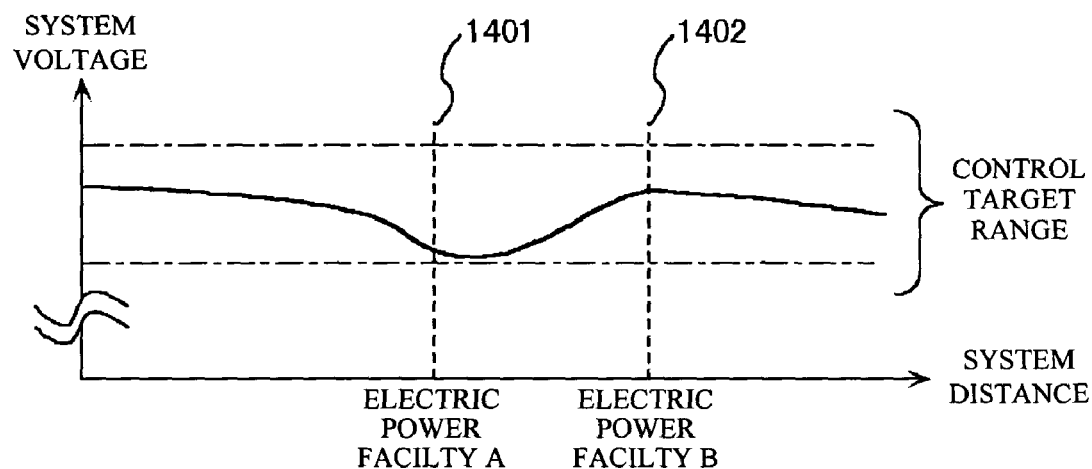
FIG. 14 shows an example (No. 2) of coordinated operation in the electric power system (after coordination).

By repeating the coordination-plan additional-correction means 610 as shown in FIG. 11, a schedule can be implemented whereby the voltage upper/lower limitation constraints can be avoided as a whole. For example, assume now that an electric power facility A (1201) having a phase modifying equipment that can be connected or disconnected, and an electric power facility B (1202) having a distributed power resource connected via a power converter are closely linked to an electric power system 1203. If no coordination efforts were to be made, a voltage increase 1301 caused by a facility 1204 in a connected state, and a voltage increase 1302 caused by the distributed power resource output in the electric power facility B, would cause the problem of excessive voltages in a normal state. This problems is addressed in the example of FIG. 12, in which, after the facility 1204 linked to the electric power facility A is disconnected during the night, a schedule is adopted that adjusts the phase factor of the electric power converter of the electric power facility B. Thus, the voltage upper/lower limitation constraints can be satisfied as indicated by 1401 and 1402 in FIG. 14.

Depending on the type of the distributed power resources, the output can be temporarily adjusted by means other than the phase factor. For example, in an electric power facility equipped with a distributed power resource having a low-efficiency and high-output operation mode, such as represented by an engine generator capable of temporary overload operation, or a compression ignition engine, it is possible to handle the switching of the operation mode via the coordinating controller as a control variable in the above-mentioned optimization problem.

Thus, the operation instruction system according to the invention can satisfy the voltage upper/lower limitation constraints. Particularly, voltage drops can be avoided even when distributed power resources including an inductive generator such as a wind power generator, which tends to cause voltage drops in the electric power system, are connected in parallel to the system. The invention allows those distributed power resources that have to be disconnected each time they developed a voltage violation to be operated for a longest possible period of time. The invention can be also effectively applied to solar energy generation, which produces wild voltage fluctuations. The invention can also help reduce the amount of investment on the phase modifying equipment by taking full advantage of the phase-modifying capability of the distributed power resource, such as by phase factor adjustment.

It is also possible to set the adjustment (such as a phase voltage imbalance ratio) of imbalance in a three-phase voltage in a power distribution network as the purpose of coordination. By handling the connection phases of the individual electric power facilities as the electric power facility data, the imbalance adjustment can be achieved by adjusting the phase modifying equipment or the distributed power resources. As the amount of work required for adjusting the balance among the connection phases can be minimized, the necessary amount of investment can be reduced.

Thus, the quality of electric power systems can be maintained by coordinating the electric power facilities according to a simple schedule on a daily basis, for example, using the coordinating controller according to the invention. As a result, the cost pertaining to the phase modifying equipment used for maintaining the electric power quality can be minimized, thus providing economic advantages to both the operator of the electric power system and that of the electric power facilities.

Coordinating distributed power resources not only helps maintain the voltage quality but also contributes to enhancing the efficiency of the electric power generating facilities. If individual distributed power resources pursue maximum generating efficiency on their own without any coordination among them, this could result in linkage rejection or forced shutdown. However, by using the coordinating controller according to the invention, the individual distributed power resources can be coordinated such that the amount of generated electricity can be maximized as a whole.

Because of such economical effects, it is possible to provide a procedure for realizing a business model for sharing the economic effects, in addition to the communication capability of the coordinating controller. In the following, a mode of business relating to the present invention will be described.

Figure 15:
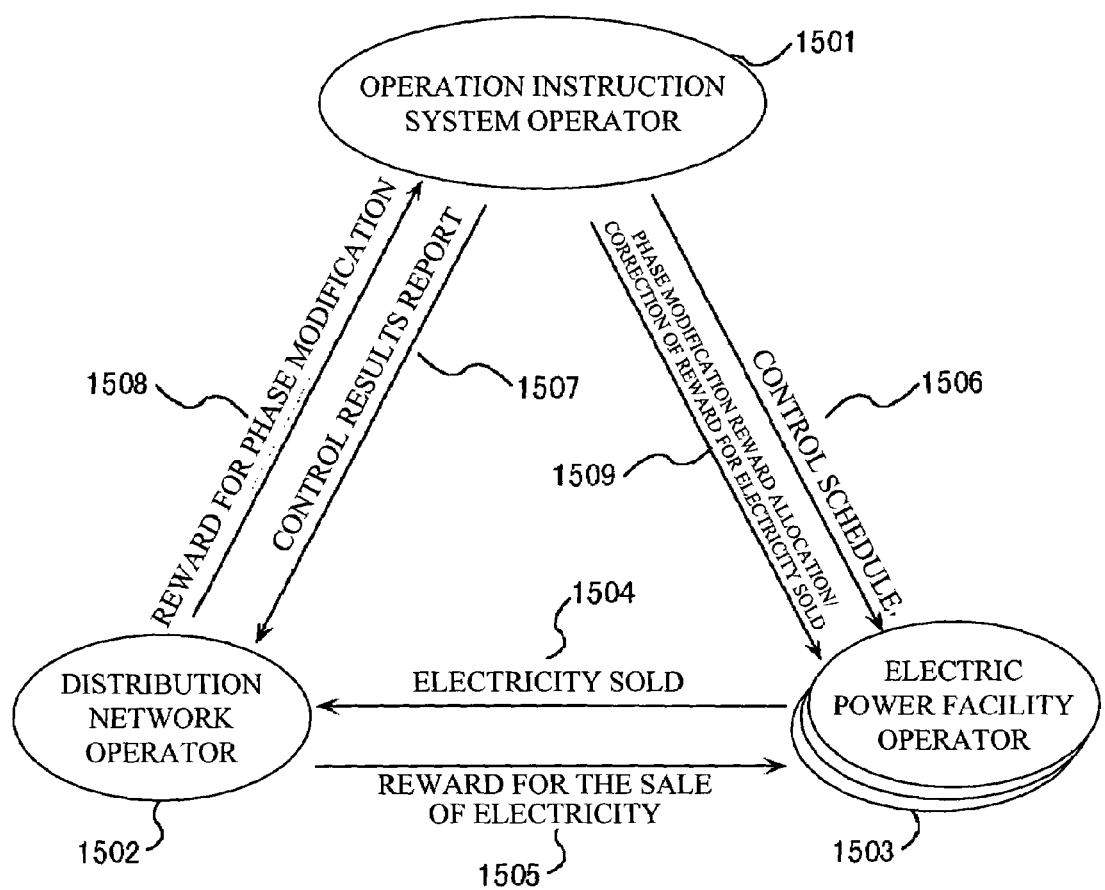
FIG. 15 shows a business model according to the invention.

FIG. 15 shows a relationship among individual operators around an operator of an operation instruction system. Numeral 1501 designates an operator ("operation instruction system operator") operating the operation instruction system. Numeral 1502 designates an operator ("distribution network operator") operating a power distribution network. Numeral 1503 designates operators ("electric power facility operators," namely clients) of an electric power facility equipped with a coordinating controller.

The electric power facility operators 1503, when their electric power facilities are equipped with a distributed power resource and a reverse power flow facility and are therefore capable of selling electricity, deal with the distribution network operator 1502 by selling electricity 1504 and receiving reward 1505.

Separately, the electric power facility operators 1503 have monetary relationship with the operation instruction system operator 1501. Specifically, the operation instruction system operator 1501 has the individual electric power facility operators carry out the control schedule 1506, as described in the above embodiments. The operation instruction system operator 1501 notifies the distribution network operator 1502 of the control results in the form of a control result report 1507. The distribution network operator 1502, in response to the notification, pays a predetermined phase-modification reward 1508 to the operation instruction system operator 1501, who distributes the reward among the electric power facility operators 1503. Depending on the control schedule, there could be an electric power facility operator whose amount of electricity sold was restricted for the sake of the general electric power quality. In order to correct this, a correction of the reward for the electricity sold is calculated during the distribution of reward, and the correction is given to the electric power facility operator in addition to the phase modification reward in the form of phase modification reward allocation/correction of reward for electricity sold 1509.

Figure 16:
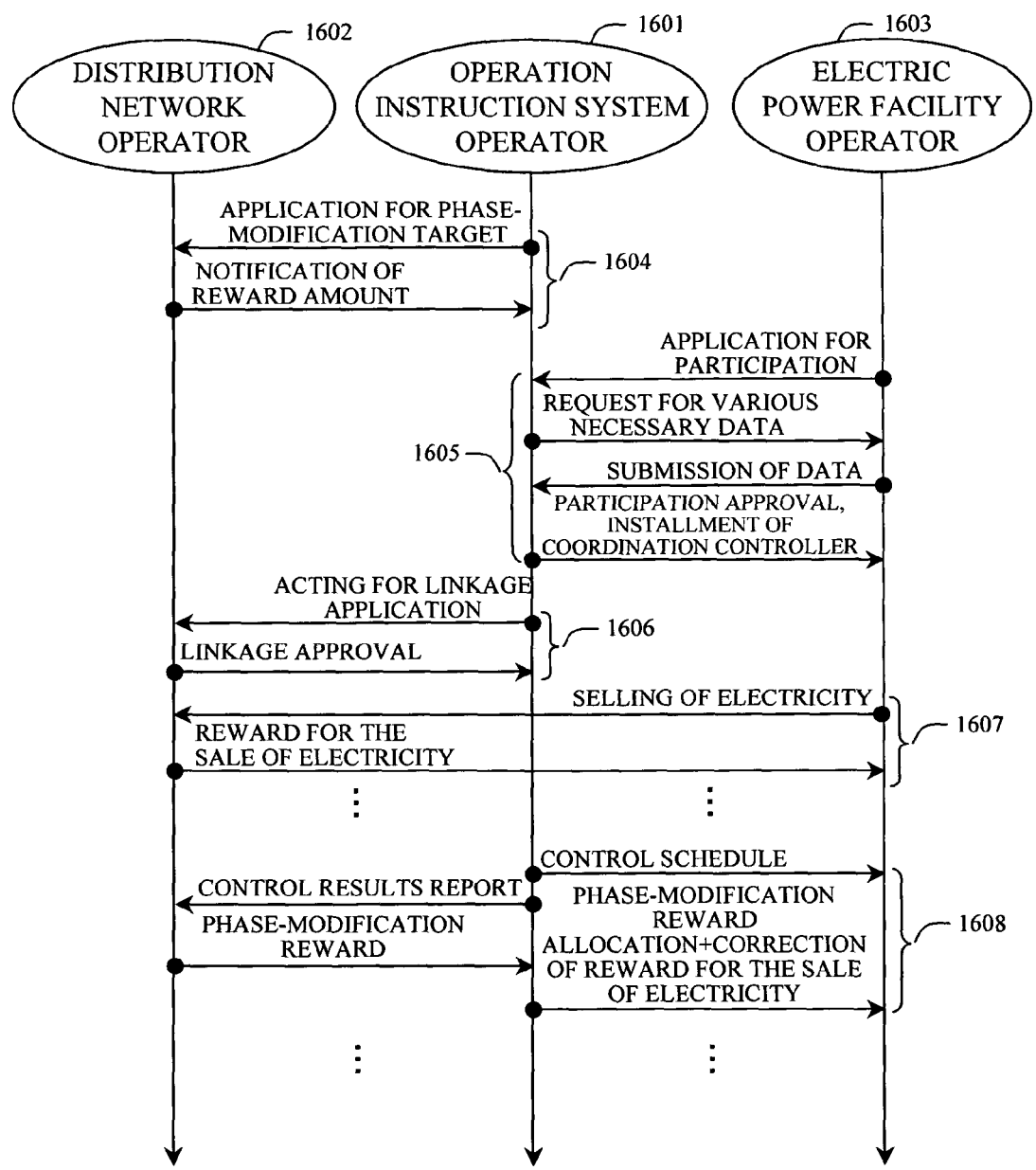
FIG. 16 shows a business flow according to the invention.

Referring to FIG. 16, the chronological order of the business model according to the invention will be described in more detail. Numeral 1601 designates an operator of an operation instruction system, numeral 1601 designates the operator of a distribution network, and 1603 designates the owner of an electric power facility in which a coordinating controller is installed.

An transaction 1604 indicates the prior consultation about the purpose of the preparation of a schedule for the operation instruction system. Specifically, by the consultation between the operation instruction system operator 1601 and the distribution network operator 1602, the management of the target electric power quality and its reward are arranged in advance.

Then, the operation instruction system operator 1601 carries out an transaction 1605 for inviting electric power facility operators 1603. When an electric power facility operator 1603 has applied for participation in a consortium of the operators, the operation instruction system operator 1601 examines the operator 1603. Specifically, after obtaining necessary data from the electric power facility operator 1603, the operation instruction system operator 1601 checks to see if the participation of the applicant will pose serious problem in the quality of the electric power in the distribution network, using the calculations described in the embodiments. Once the application is granted, the operation instruction system operator 1601 provides the electric power facility operator 1603 with the coordinating controller.

Separately, the operation instruction system operator 1601 carries out a process 1606 for acting for the distribution network operator 1602 concerning the various procedures relating to the linkage application from the electric power facility operator 1603. After these processes are completed, the electric power facility operator 1603 is granted linkage to the electric power system.

In the case where the electric power facility operator 1603 possesses a distributed power resource and a reverse power flow facility and the electric power facility is therefore capable of selling electricity, the electric power facility operator 1603 conducts an transaction 1607 with the distribution network operator 1602 concerning the selling of electricity and the reward therefor. This procedure is conducted according to the conventional rules of selling and buying of electric power and does not involve the operation instruction system operator 1601.

An transaction 1608 concerning coordination control is conducted separately. Initially, the operation instruction system operator 1601 causes each electric power facility operator to carry out the control schedule in order to satisfy the predetermined purpose of maintaining the electric power quality of the distribution network as described above. The purpose is determined in 1604. The operation instruction system operator 1601 notifies the distribution network operator 1602 of the results of the control, and then the distribution network operator 1602 pays a predetermined phase-modification reward to the operation instruction system operator 1601.

The operation instruction system operator 1601 distributes the reward to the individual electric power facility operators 1603. Depending on the control schedule, however, there might be one or more electric power facility operator whose sale of electricity was restricted for the sake of the overall power quality. In order to correct this during the distribution of the reward, an electricity sale reward correction value is calculated. The total value of the electricity sale reward corrections for all of the electric power facility owners is zero. The electricity sale reward correction value is added to the phase-modification result reward to provide a phase-modification reward allocation/electricity sale reward correction.

The transactions 1607 and 1608 are conducted at the schedule-update intervals (that is on a daily basis in the above-described embodiment) and settlements are made as required.

Thus, by using the coordinating controller according to the invention, there is no need to assume that all of the distributed power resources for which linkage has been granted will operate freely. From the viewpoint of the operator of an electric power system, this means that the deterioration in quality, such as the lowered voltage in the electric power system due to the unrestricted operation of the distributed power resources, can be avoided. Further, in terms of planning phase modifying equipment, it can be expected that the amount of equipment investment can be reduced. From the viewpoint of the operator of a distributed power resource, the necessary conditions to be met during the examination of a linkage application can be relaxed, thereby providing the operator with an economic advantage.

The invention takes into account both positive and negative influences of the distributed power resources on the electric power quality of the electric power system. Thus, equipment cost to be borne by both the operator of the electric power system and those of the electric power facilities for the maintenance of the electric power quality can be minimized. Accordingly, those multiple operators can share the economic advantage.

What is claimed is:

1. A system comprising:
a coordination controller;
at least one electric power-consuming apparatus or electric power generating apparatus constituting an electric power facility, the at least one electric power-consuming apparatus or electric power generating apparatus being controlled by the coordination controller;
an electric power system linked to the electric power facility,
wherein the coordination controller comprises:
means for communicating with the outside of the electric power facility;
means for monitoring the current time;
means for achieving synchronization with the time of the outside; and
means for receiving a control schedule for the electric power-consuming apparatus or electric power generating apparatus, and
wherein the control schedule is implemented in accordance with the time obtained by the time monitoring means.

2. A system comprising:
a coordination controller;
electric power equipment controlled by the coordination controller;
an electric power facility;
an electric power system linked to the electric power facility,
wherein the coordination controller comprises:
means for receiving the contents of control of the electric power equipment and a control schedule concerning the time of implementation of the control contents, the control contents being transmitted from the outside of the electric power facility;
means for monitoring the current time; and
means for outputting a control instruction based on the control schedule received by the receiving means to the electric power equipment, in accordance with the time monitored by the time monitoring means.

3. The system according to claim 2, wherein
the electric equipment comprises a distributed power resource, a reactor, or a capacitor, and wherein
the control schedule pertains to the time of connecting or disconnecting the distributed power resource, reactor, or capacitor in parallel to or from the electric power system.

4. The system according to claim 2, wherein
the electric power equipment is an electric power converter with an adjustable phase factor, and wherein
the control schedule pertains to the setting of the phase factor of the electric power converter and the time of setting of the phase factor.

5. A system comprising:
a coordination controller;
an electric power facility controlled by a coordination controller,
wherein the coordination controller comprises:
means for storing information about electric power equipment in a plurality of electric power facilities that can be linked to an electric power system, and information about the electric power system;
means for creating a control schedule using the information about the electric power equipment in the electric power facilities and the information about the electric power system, the control schedule pertaining to the contents of control of the electric power equipment in the electric power facilities and the time of implementation of the control contents; and
means for transmitting the created control schedule to the electric power facilities.

6. The system according to claim 5, wherein the control schedule creating means creates the control schedule under the condition that the quality of electric power in the electric power system is controlled to within a predetermined reference value.

7. The system according to claim 6, wherein the electric power quality is defined in terms of an instantaneous voltage value in the electric power system, a voltage value in a steady state, or a voltage unbalance ratio.

8. The system according to claim 5, wherein the coordination controller further comprises:

means for creating a control schedule pertaining to the contents of control of the electric power equipment in the electric power facilities and the time of implementation of the control contents;

means for analyzing the quality of electric power in the electric power system according to the control schedule;

means for correcting the control schedule if the analyzed electric power quality in the electric power system does not meet a predetermined quality; and means for transmitting the control schedule created by the control schedule creating means or corrected by the control schedule correcting means to the electric power facilities.

9. The system according to claim 5, wherein the electric power quality is defined in terms of an instantaneous voltage value in the electric power system, a voltage value in a steady state, or a voltage unbalance ratio.

10. The system according to claim 5, wherein the coordination controller further comprises:

means for transmitting a signal indicating the creation of a right to obtain a certain reward based on the control schedule to the electric power facilities.

11. The system according to claim 6, wherein the certain reward is commensurate with a value indicating how much cost reduction has been achieved by the electric power facilities with regard to the selling of electricity in accordance with the control schedule.

* * * * *